(12) United States Patent
Hu et al.

(10) Patent No.: US 12,163,566 B2
(45) Date of Patent: Dec. 10, 2024

(54) VIBRATION DAMPING BRACKET AND ELECTRONIC DEVICE

(71) Applicant: HUAWEI TECHNOLOGIES CO., LTD., Guangdong (CN)

(72) Inventors: Zhenming Hu, Hangzhou (CN); Jianqiang Yin, Dongguan (CN); Xiaofei Li, Dongguan (CN); Rucheng Zhu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 309 days.

(21) Appl. No.: 17/716,469

(22) Filed: Apr. 8, 2022

(65) Prior Publication Data

US 2022/0235846 A1    Jul. 28, 2022

Related U.S. Application Data

(63) Continuation of application No. PCT/CN2020/092175, filed on May 25, 2020.

(30) Foreign Application Priority Data

Oct. 10, 2019    (CN) .......................... 201910959037.X

(51) Int. Cl.
  *F16F 15/08*    (2006.01)
  *F16M 13/02*   (2006.01)
  *G11B 33/08*   (2006.01)
(52) U.S. Cl.
  CPC ........... *F16F 15/085* (2013.01); *F16M 13/02* (2013.01); *G11B 33/08* (2013.01)

(58) Field of Classification Search
  CPC ........ F16F 15/085; F16M 13/02; G11B 33/08
  See application file for complete search history.

(56) References Cited

U.S. PATENT DOCUMENTS

| | | | |
|---|---|---|---|
| 7,251,131 B2 * | 7/2007 | Shah | G11B 33/12 |
| 7,515,407 B2 * | 4/2009 | Goodman | G11B 33/124 |
| | | | 248/634 |

(Continued)

FOREIGN PATENT DOCUMENTS

| | | |
|---|---|---|
| CN | 101102652 A | 1/2008 |
| CN | 101754621 A | 6/2010 |

(Continued)

OTHER PUBLICATIONS

Office Action in Chinese Appln. No. 201910959037.X, dated Jun. 22, 2020, 23 pages (with English translation).

(Continued)

*Primary Examiner* — Monica E Millner
(74) *Attorney, Agent, or Firm* — Fish & Richardson P.C.

(57) ABSTRACT

One example vibration damping bracket provided in some embodiments of this application includes a fastening bracket, a first bracket body, a second bracket body, a first vibration damping component, and a second vibration damping component. The first bracket body is elastically connected to the fastening bracket by using the first vibration damping component. The second bracket body is elastically connected to the first bracket body by using the second vibration damping component. The first vibration damping component includes a metal elastic part configured to absorb vibration, and the second vibration damping component includes a rubber elastic part configured to absorb vibration.

20 Claims, 15 Drawing Sheets

(56) References Cited

U.S. PATENT DOCUMENTS

| | | | | |
|---|---|---|---|---|
| 8,289,693 | B2* | 10/2012 | Li | G06F 1/187 |
| | | | | 720/689 |
| 8,300,352 | B1* | 10/2012 | Larson | G11B 25/043 |
| | | | | 360/97.11 |
| 8,480,052 | B2* | 7/2013 | Taylor | G06F 1/187 |
| | | | | 267/152 |
| 8,730,661 | B2* | 5/2014 | Lai | G11B 33/08 |
| | | | | 361/679.33 |
| 9,520,158 | B1* | 12/2016 | Lyu | G11B 33/124 |
| 10,042,398 | B2* | 8/2018 | Okutsu | H04N 5/64 |
| 2002/0054475 | A1* | 5/2002 | Boss | G06F 1/187 |
| 2002/0162808 | A1* | 11/2002 | Jordan | H05K 7/1425 |
| | | | | 248/638 |
| 2005/0013110 | A1* | 1/2005 | Shah | G11B 33/142 |
| 2006/0181845 | A1 | 8/2006 | Shah et al. | |
| 2007/0025014 | A1* | 2/2007 | Kim | G11B 33/08 |
| 2007/0089948 | A1 | 4/2007 | Tanaka et al. | |
| 2008/0168483 | A1* | 7/2008 | Chen | G11B 33/08 |
| | | | | 720/651 |
| 2008/0316698 | A1* | 12/2008 | Yeh | G11B 33/08 |
| | | | | 361/679.33 |
| 2009/0267276 | A1* | 10/2009 | Sugimoto | F16F 7/104 |
| | | | | 267/75 |
| 2011/0001409 | A1* | 1/2011 | Peng | G11B 33/128 |
| | | | | 312/301 |
| 2011/0031373 | A1* | 2/2011 | Fortes | B64D 43/00 |
| | | | | 248/600 |
| 2012/0138493 | A1* | 6/2012 | Tung-Ke | G11B 33/08 |
| | | | | 206/320 |
| 2019/0025893 | A1* | 1/2019 | Smith | G11B 33/08 |
| 2019/0249823 | A1* | 8/2019 | Chou | F16F 1/3735 |

FOREIGN PATENT DOCUMENTS

| | | | |
|---|---|---|---|
| CN | 201984824 U | 9/2011 | |
| CN | 104049695 A | 9/2014 | |
| CN | 205454332 U | 8/2016 | |
| CN | 107247489 A | 10/2017 | |
| CN | 206976022 U | 2/2018 | |
| CN | 108012489 A | 5/2018 | |
| CN | 207503642 U | 6/2018 | |
| CN | 207814295 U | 9/2018 | |
| CN | 108829198 A | 11/2018 | |
| CN | 109681576 A | 4/2019 | |
| CN | 208737366 U | 4/2019 | |
| CN | 209283619 U | 8/2019 | |
| CN | 209435639 U | 9/2019 | |
| CN | 110822261 A | 2/2020 | |
| DE | 102013105552 A1 | 12/2014 | |
| EP | 3517803 A1 | 7/2019 | |
| JP | 2003141866 A | 5/2003 | |
| JP | 2004259312 A | 9/2004 | |
| JP | 2010287262 A | 12/2010 | |
| KR | 20180006289 A | 1/2018 | |
| WO | 2004100168 A1 | 11/2004 | |

OTHER PUBLICATIONS

Office Action in Chinese Appln. No. 201910959037.X, dated Feb. 20, 2021, 17 pages (with English translation).

Office Action in Chinese Appln. No. 201910959037.X, dated Apr. 26, 2021, 18 pages (with English translation).

Extended European Search Report in European Appln No. 20875615.5, dated Oct. 4, 2022, 10 pages.

Office Action in Indian Appln. No. 202247024472, dated Jun. 15, 2022, 7 pages (with English translation).

International Search Report and Written Opinion in International Appln. No. PCT/CN2020/092175, mailed on Aug. 21, 2020, 13 pages (with English translation).

Office Action in Japanese Appln. No. 2022-521561, dated May 9, 2023, 7 pages (with English translation).

Office Action in Korean Appln. No. 10-2022-7014783, mailed on Feb. 22, 2024, 12 pages.

* cited by examiner

VIBRATION DAMPING BRACKET AND ELECTRONIC DEVICE

CROSS-REFERENCE TO RELATED APPLICATIONS

This application is a continuation of International Application No. PCT/CN2020/092175, filed on May 25, 2020, which claims priority to Chinese Patent Application No. 201910959037.X, filed on Oct. 10, 2019. All of the aforementioned patent applications are hereby incorporated by reference in their entireties.

TECHNICAL FIELD

This application relates to the field of electronic device technologies, and in particular, to a vibration damping bracket and an electronic device.

BACKGROUND

There are various types of electronic devices. To meet different use requirements of users, electronic devices may be applied to different fields. For example, to monitor a traveling condition (such as a traffic condition or a driver condition) of a vehicle, a surveillance camera is gradually widely used in vehicles. To store image information collected by the surveillance camera, a storage device may be further mounted in the vehicle. For example, the storage device is a mechanical hard disk (Hard Disk Dive, HDD). The mechanical hard disk has advantages such as low costs and a large capacity, and therefore is widely used. However, the mechanical hard disk is relatively sensitive to vibration, and relatively large vibration affects normal working of the mechanical hard disk, and even causes damage to the mechanical hard disk and a data loss. To reduce strength of vibration transmitted to the mechanical hard disk, some manufacturers mount mechanical hard disks in vehicles by using steel wire rope shock dampers. However, the steel wire rope shock damper is expensive and heavy and needs large mounting space, and therefore is not conducive to wide-range use.

SUMMARY

This application provides a vibration damping bracket with good vibration damping performance, and an electronic device.

The vibration damping bracket provided in this application includes a fastening bracket, a first bracket body, a second bracket body, a first vibration damping component, and a second vibration damping component. The first bracket body is elastically connected to the fastening bracket by using the first vibration damping component. The second bracket body is elastically connected to the first bracket body by using the second vibration damping component. The first vibration damping component includes a metal elastic part configured to absorb vibration, and the second vibration damping component includes a rubber elastic part configured to absorb vibration, thereby implementing multi-level vibration absorption. Specifically, when there is vibration on the fastening bracket, in a process of transmitting the vibration from the fastening bracket to the first bracket body, the first vibration damping component absorbs the vibration to first damp the vibration; and in a process of transmitting vibration from the first bracket body to the second bracket body, the second vibration damping component absorbs the vibration to second damp the vibration, thereby implementing multi-level vibration absorption. In addition, considering that vibration usually has a relatively wide vibration frequency, to improve a vibration absorption effect, in the vibration damping bracket provided in this application, the first vibration damping component and the second vibration damping component may pertinently absorb vibration with different frequencies. Specifically, the first vibration damping component includes a metal elastic part configured to absorb vibration with a high frequency (for example, at least 500 Hz), and the second vibration damping component includes a rubber elastic part configured to absorb vibration with a low frequency (for example, below 500 Hz). Under joint action of the first vibration damping component and the second vibration damping component, vibration transmitted to the second bracket body can be effectively damped, so that the vibration damping bracket has a good vibration damping effect.

During specific implementation, the fastening bracket may be connected to the first bracket body in a plurality of manners.

For example, in an implementation provided in this application, the first bracket body is connected to the fastening bracket in a slidable assembly manner. To damp vibration perpendicular to a sliding direction between the first bracket body and the fastening bracket, the first vibration damping component includes a first vibration stopping part, and the first vibration stopping part is disposed in a sliding gap between the first bracket body and the fastening bracket. When vibration (displacement) perpendicular to the sliding direction exists between the first bracket body and the fastening bracket, the first vibration stopping part can well absorb the vibration through elastic deformation of the first vibration stopping part, to damp vibration transmission.

Specifically, the fastening bracket has a guiding groove, and the first bracket body has a guiding rail that slidably fits with the guiding groove. When the first bracket body and the fastening bracket are assembled, the guiding groove may be slidably fitted with the guiding rail, to complete the assembly between the first bracket body and the fastening bracket. To improve connection stability between the fastening bracket and the first bracket body, in some implementations, a plurality of guiding grooves may be disposed on the fastening bracket, a plurality of guiding rails may be disposed on the first bracket body, and the plurality of guiding grooves are disposed in a one-to-one correspondence with the plurality of guiding rails, to improve the connection stability between the fastening bracket and the first bracket body.

To damp vibration transmission between the fastening bracket and the first bracket body, in an implementation solution provided in this application, there is the sliding gap between the guiding rail and the guiding groove, the first vibration stopping part includes a spring plate, and the spring plate has at least one spring arm. The spring plate is disposed in the sliding gap between the guiding groove and the guiding rail, to implement the elastic connection between the first bracket body and the fastening bracket. When displacement (vibration) perpendicular to the sliding direction exists between the first bracket body and the fastening bracket, the spring plate can well absorb the vibration (or reduce a displacement amount) through elastic deformation of the spring plate, to achieve a vibration damping effect.

During specific implementation, the spring plate may be fastened to the guiding rail, and the spring arm may elastically abut against an inner wall of the guiding groove.

Certainly, alternatively, the spring plate may be fastened into the guiding groove, and the spring arm may elastically abut against the guiding rail, to implement the elastic connection between the fastening bracket and the first bracket body.

In addition, because the fastening bracket and the first bracket body are assembled in the slidable assembly manner, to prevent the first bracket body from being detached from the fastening bracket (the guiding rail from sliding out of the guiding groove), in some implementations, the first vibration damping component may further include a limiting component. The limiting component is connected to the fastening bracket and the first bracket body to limit a maximum sliding distance between the fastening bracket and the first bracket body. That is, after the first bracket body and the fastening bracket are slidably assembled (the guiding rail is inserted into the guiding groove), to prevent the first bracket body from being detached from the fastening bracket (the guiding rail from sliding out of the guiding groove), the fastening bracket may be connected to the first bracket body by using the limiting component. In addition, sliding with a relatively small displacement can be allowed between the first bracket body and the fastening bracket.

Certainly, to prevent the fastening bracket from rigidly colliding with the first bracket body in the sliding direction, in some specific implementations, the first vibration damping component may further include a second vibration stopping part, to absorb vibration between the first bracket body and the fastening bracket in the sliding direction.

During specific implementation, the second vibration stopping part may be a coil spring, a metal spring plate, or another mechanical part that can be elastically deformed, to well absorb vibration.

In addition, in some specific implementations, the first bracket body may also be connected to the second bracket body in a plurality of manners.

Specifically, in a specific implementation provided in this application, the second vibration damping component includes a first rubber body, the first rubber body is disposed between the first bracket body and the second bracket body, and the first rubber body is fixedly connected to the first bracket body by using a first connecting portion and is fixedly connected to the second bracket body by using a second connecting portion. When vibration in the first bracket body is transmitted to the second bracket body, the vibration can be well absorbed under action of the first rubber body, to damp the vibration transmitted to the second bracket body.

During specific implementation, the first rubber body may be connected to the first bracket body in a plurality of manners, and correspondingly, the first rubber body may also be connected to the second bracket body in a plurality of manners.

For example, in an implementation provided in this application, the first rubber body is connected to the first bracket body by using a bolt. Specifically, the first connecting portion is structured as a threaded hole, the first bracket body has a through hole, and the bolt is screwed to the threaded hole in the first rubber body after being penetrated through the through hole in the first bracket body, to implement the fastened connection between the first rubber body and the first bracket body. The second connecting portion is structured as a threaded hole, the second bracket body has a through hole, and a bolt is screwed to the threaded hole in the first rubber body after being penetrated through the through hole in the second bracket body, to implement the fastened connection between the first rubber body and the second bracket body. Certainly, in some other specific implementations, the first rubber body may be connected to the first bracket body by using an adhesive such as glue, and correspondingly, the first rubber body may also be connected to the second bracket body by using an adhesive such as glue.

During specific implementation, the first rubber body may be a solid structure, or may be a hollow structure.

For example, in an implementation provided in this application, the first rubber body may be a centrally expanded columnar structure, the first connecting portion is disposed on one end of the first rubber body, the second connecting portion is disposed on the other end of the first rubber body, and a hollow portion is disposed between the first connecting portion and the second connecting portion. When there is vibration transmission between the first bracket body and the second bracket body, a deformation amount of the first rubber body may be improved due to disposition of the hollow portion. That is, under action of an external force (vibration), the first rubber body is more prone to elastic deformation, thereby improving a vibration absorption effect. During specific implementation, one or more hollow portions may be disposed, and the hollow portion may also have various shapes.

Certainly, in some implementations, the second vibration damping component may also have various structural forms.

For example, in a specific implementation provided in this application, the second vibration damping component includes a connecting part and a second rubber body, and the first bracket body is connected to the second bracket body by using the connecting part. The second rubber body is located between the second bracket body and the first bracket body and between the second bracket body and the connecting part, to prevent the second bracket body from being in rigid contact with the first bracket body and the connecting part. When vibration is transmitted from the first bracket body to the second bracket body, the second rubber body may effectively absorb the vibration.

During specific implementation, the connecting part may be a bolt, a fastening hole configured to fasten the second rubber body may be disposed in the second bracket body, and a threaded hole configured to be connected to the bolt may be disposed in the first bracket body. A through hole through which the bolt is penetrated is disposed in the second rubber body, and the bolt may be screwed to the second bracket body after being penetrated through the through hole in the second rubber body. Specifically, the second rubber body may be a columnar structure, the through hole through which the bolt is penetrated is disposed at an axis of the second rubber body, and an annular groove is disposed on the periphery of the second rubber body. The second rubber body may be inserted into the mounting hole through fitting between the annular groove and the mounting hole in the second bracket body. After the bolt is screwed to the threaded hole in the first bracket body, one end of the second rubber body abuts against a screw cap of the bolt, and the other end of the second rubber body abuts against the second bracket body, to prevent the second bracket body from being in rigid contact with the first bracket body and the bolt.

It may be understood that, the first bracket body may be connected to the second bracket body by using a plurality of second vibration damping components described above, to improve connection stability between the first bracket body and the second bracket body, and also effectively improve vibration absorption performance. In addition, in some implementations, more bracket bodies and more vibration damping components may be disposed to improve overall vibration damping performance of the vibration damping bracket. Specifically, in addition to the fastening bracket, the first bracket body, the second bracket body, the first vibration damping component, and the second vibration damping component, a third bracket body and a third vibration damping component may be further disposed in the vibration damping bracket. The third bracket body is elastically connected to the second bracket body by using the third vibration damping component. During specific implementation, a structure of the third vibration damping component may be the same as or approximately the same as the structure of the second vibration damping component.

During actual application, the vibration damping bracket in this application may be widely applied to any environment in which vibration needs to be damped.

For example, this application further provides an electronic device, including an electrical component and the foregoing vibration damping bracket. During specific implementation, there may be various specific types and quantities of electrical components. For example, the electrical component may be a processor, a removable hard disk, a circuit board, or the like. In addition, the electrical component may also be fastened to various positions on the vibration damping bracket. For example, some electrical components may be fastened to the first bracket body, and some electrical components relatively sensitive to vibration may be fastened to the third bracket body, so that positions of electrical components may be properly adjusted based on different requirements.

DESCRIPTION OF EMBODIMENTS

Figure 1:
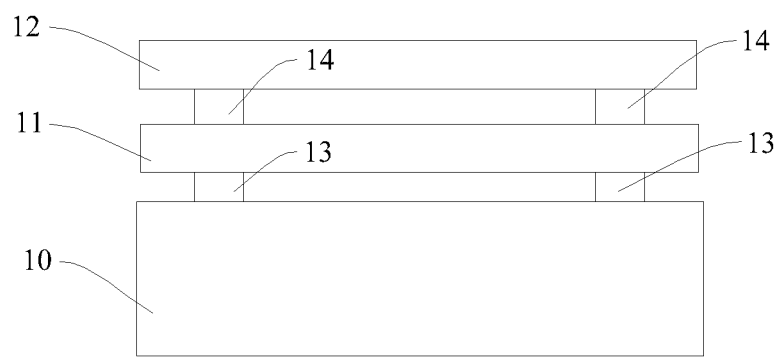
FIG. 1 is a schematic structural diagram of a vibration damping bracket according to an embodiment of this application.

To make the objectives, technical solutions, and advantages of this application clearer, the following further describes this application in detail with reference to the accompanying drawings.

To facilitate understanding of a vibration damping bracket provided in the embodiments of this application, the following first describes an application scenario of the vibration damping bracket. The vibration damping bracket provided in the embodiments of this application may be applied to an electronic device, to fasten and mount a functional component (such as a storage device, a circuit board, or a processor) in the electronic device, and further damp shock. For example, when the electronic device includes a mechanical hard disk, the mechanical hard disk may be fixedly mounted in the electronic device by using the vibration damping bracket, to damp vibration transmitted to the mechanical hard disk, thereby ensuring normal operation of the mechanical hard disk, and effectively preventing a bad condition such as a data loss. Certainly, the vibration damping bracket provided in the embodiments of this application may also be applied to a vehicle. For example, a functional component such as a mechanical hard disk, a photographing apparatus, or a processor may be mounted in the vehicle by using the vibration damping bracket, so that force transmission can be damped when the vehicle is bumped, crashed, or accelerated/decelerated, thereby ensuring normal working of the functional component such as the mechanical hard disk. Certainly, during actual application, the vibration damping bracket is also applicable to another functional component relatively sensitive to vibration. In addition, the vibration damping bracket may also be applied to an environment with obvious vibration (such as a street side or a construction site).

To implement a good vibration damping effect, in the vibration damping bracket provided in this application, multi-level filtering and absorption are performed on vibration in a form of multi-level vibration damping, and vibration with different frequencies is pertinently absorbed in cooperation with vibration damping parts with different performance, to improve shock absorption performance of the vibration damping bracket. To facilitate clear understanding of the technical solutions of this application, the following specifically describes, with reference to the accompanying drawings, the vibration damping bracket provided in the embodiments of this application.

Terms used in the following embodiments are merely intended to describe specific embodiments, but not intended to limit this application. The singular expressions "one", "a", "the foregoing", "the", and "this" used in this specification and the appended claims of this application are also intended to include expressions such as "one or more", unless otherwise specified in the context clearly. It should be further understood that, in the following embodiments of this application, "at least one" or "one or more" means one, two, or more. The term "and/or" is used to describe an association relationship for describing associated objects and represents that three relationships may exist. For example, A and/or B may represent the following three cases: Only A exists, both A and B exist, and only B exists. A and B may be singular or plural. The character "/" generally indicates an "or" relationship between the associated objects.

Reference to "an embodiment", "some embodiments", or the like described in this specification means that a specific feature, structure, or characteristic described with reference to the embodiment is included in one or more embodiments of this application. Therefore, statements such as "in an embodiment", "in some embodiments", "in some other embodiments", and "in some other embodiments" that appear in different parts of this specification each do not necessarily mean reference to the same embodiment, but mean reference to "one or more but not all embodiments", unless otherwise specifically emphasized. The terms "include", "comprise" and "have", and variations thereof all mean "include but not limited to", unless otherwise specifically emphasized.

As shown in FIG. 1, in an embodiment provided in this application, a vibration damping bracket 1 includes a fastening bracket 10, a first bracket body 11, a second bracket body 12, a first vibration damping component 13, and a second vibration damping component 14. The first bracket body 11 is elastically connected to the fastening bracket 10 by using the first vibration damping component 13, and the second bracket body 12 is elastically connected to the first bracket body 11 by using the second vibration damping component 14, to implement multi-level vibration absorption. Specifically, when there is vibration on the fastening bracket 10, the vibration is transmitted from the fastening bracket 10 to the second bracket body 12 in the following sequence: the fastening bracket 10→the first vibration damping component 13→the first bracket body 11→the second vibration damping component 14→the second bracket body 12. That is, when the vibration is transmitted from the fastening bracket 10 to the first bracket body 11, the first vibration damping component 13 absorbs the vibration to first damp the vibration; and when vibration is transmitted from the first bracket body 11 to the second bracket body 12, the second vibration damping component 14 absorbs the vibration to second damp the vibration, thereby implementing multi-level vibration absorption. In addition, considering that vibration usually has a relatively wide vibration frequency, to improve a vibration absorption effect, in an embodiment provided in this application, the first vibration damping component 13 and the second vibration damping component 14 may pertinently absorb vibration with different frequencies. Specifically, the first vibration damping component 13 includes a metal elastic part configured to absorb vibration with a high frequency (for example, at least 500 Hz), and the second vibration damping component 14 includes a rubber elastic part configured to absorb vibration with a low frequency (for example, below 500 Hz). Under joint action of the first vibration damping component 13 and the second vibration damping component 14, vibration transmitted to the second bracket body 12 can be effectively damped, so that the vibration damping bracket 1 has a good vibration damping effect.

Figure 2:
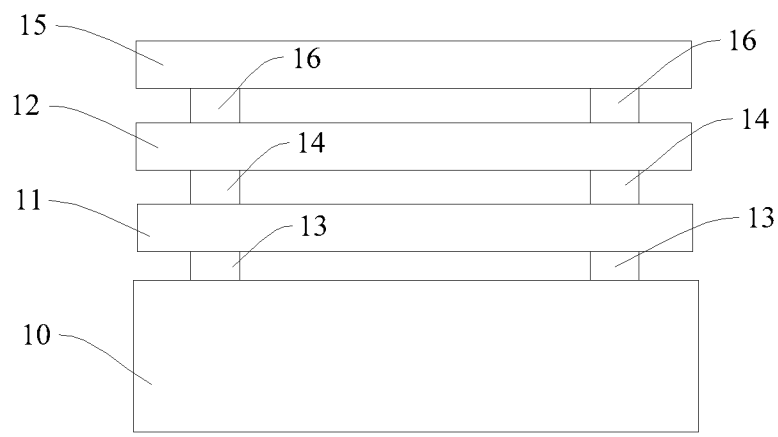
FIG. 2 is a schematic structural diagram of another vibration damping bracket according to an embodiment of this application.

During specific implementation, the vibration damping bracket 1 is not limited to including one first vibration damping component 13 and one second vibration damping component 14, and may alternatively include more vibration damping components, to implement multi-level vibration absorption. Specifically, as shown in FIG. 2, in an embodiment provided in this application, the vibration damping bracket 1 includes a fastening bracket 10, a first bracket body 11, a second bracket body 12, a first vibration damping component 13, and a second vibration damping component 14, and further includes a third bracket body 15 and a third vibration damping component 16. The first bracket body 11 is elastically connected to the fastening bracket 10 by using the first vibration damping component 13, the second bracket body 12 is elastically connected to the first bracket body 11 by using the second vibration damping component 14, and the third bracket body 15 is elastically connected to the second bracket body 12 by using the third vibration damping component 16, to implement multi-level (three-level) vibration absorption.

Specifically, when there is vibration on the fastening bracket 10, the vibration is transmitted from the fastening bracket 10 to the third bracket body 15 in the following sequence: the fastening bracket 10→the first vibration damping component 13→the first bracket body 11→the second vibration damping component 14→the second bracket body 12→the third vibration damping component 16→the second bracket body 15. That is, when the vibration is transmitted from the fastening bracket 10 to the first bracket body 11, the first vibration damping component 13 absorbs the vibration to first damp the vibration; when vibration is transmitted from the first bracket body 11 to the second bracket body 12, the second vibration damping component 14 absorbs the vibration to second damp the vibration; and when vibration is transmitted from the second bracket body 12 to the third bracket body 15, the third vibration damping component 16 absorbs the vibration to third damp the vibration, thereby implementing multi-level vibration absorption. During actual application, the third vibration damping component 16 may include a metal elastic part configured to absorb vibration with a high frequency (for example, at least 500 Hz), or may include a rubber elastic part configured to absorb vibration with a low frequency (for example, below 500 Hz). Under joint action of the first vibration damping component 13, the second vibration damping component 14, and the third vibration damping component 16, vibration transmitted to the third bracket body 15 can be effectively damped, so that the vibration damping bracket 1 has a good vibration damping effect.

In some specific implementations, the first vibration damping component 13 may have a plurality of structural forms, and the first vibration damping component 13 may be connected to the fastening bracket 10 and the first bracket body 11 in a plurality of manners.

Figure 3:
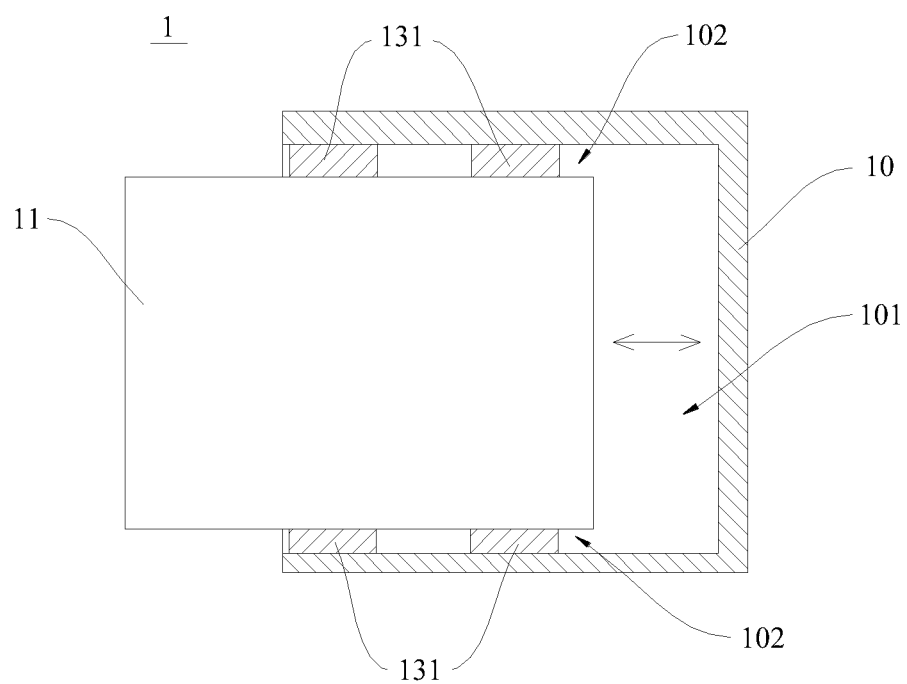
FIG. 3 is a schematic structural diagram of a fastening bracket and a first bracket body according to an embodiment of this application.

As shown in FIG. 3, in an embodiment provided in this application, the first bracket body 11 is slidably mounted on the fastening bracket 10. Specifically, the fastening bracket 10 has an accommodation cavity 101 configured to accommodate the first bracket body 11 (it may be understood that, in some implementations, the first bracket body 11 may be nakedly mounted on the fastening bracket 10). When the first bracket body 11 and the fastening bracket 10 are assembled, the first bracket body 11 is slidably assembled into the accommodation cavity 101. During specific implementation, an outer wall of the first bracket body 11 may slidably fit with an inner wall of the accommodation cavity 101 directly, or slidably fitting structures may be disposed on the first bracket body 11 and the fastening bracket 10 to implement the slidable assembly between the first bracket body 11 and the fastening bracket 10.

Still referring to FIG. 3, in an embodiment provided in this application, the outer wall of the first bracket body 11 slidably fits with the inner wall of the accommodation cavity 101, and there is a sliding gap 102 between the outer wall of the first bracket body 11 and the inner wall of the accommodation cavity 101. To damp vibration transmission between the first bracket body 11 and the fastening bracket 10, in an embodiment provided in this application, the first vibration damping component 13 includes a first vibration stopping part 131, and the first vibration stopping part 131 is disposed in the sliding gap between the first bracket body 11 and the fastening bracket 10, to maintain a relative position between the first bracket body 11 and the fastening bracket 10. In addition, when displacement (vibration) perpendicular to a sliding direction exists between the first bracket body 11 and the fastening bracket 10, the first vibration stopping part 131 can well absorb the vibration through elastic deformation of the first vibration stopping part 131, to achieve a vibration damping effect.

During specific implementation, one end of the first vibration stopping part 131 may be fastened to the first bracket body 11, and the other end of the first vibration stopping part 131 elastically abuts against the inner wall of the accommodation cavity 101. Certainly, in some specific implementations, one end of the first vibration stopping part 131 may be fixedly connected to the inner wall of the accommodation cavity 101, and the other end of the first vibration stopping part 131 elastically abuts against the outer wall of the first bracket body 11. In addition, to improve connection stability and shockproof performance between the first bracket body 11 and the fastening bracket 10, in some specific implementations, a plurality of first vibration stopping parts 131 may be disposed, and evenly spaced in the sliding gap 102.

Certainly, in another implementation, slidably fitting structures may be disposed on the first bracket body 11 and the fastening bracket 10 to implement the slidable assembly between the first bracket body 11 and the fastening bracket 10.

Figure 4:
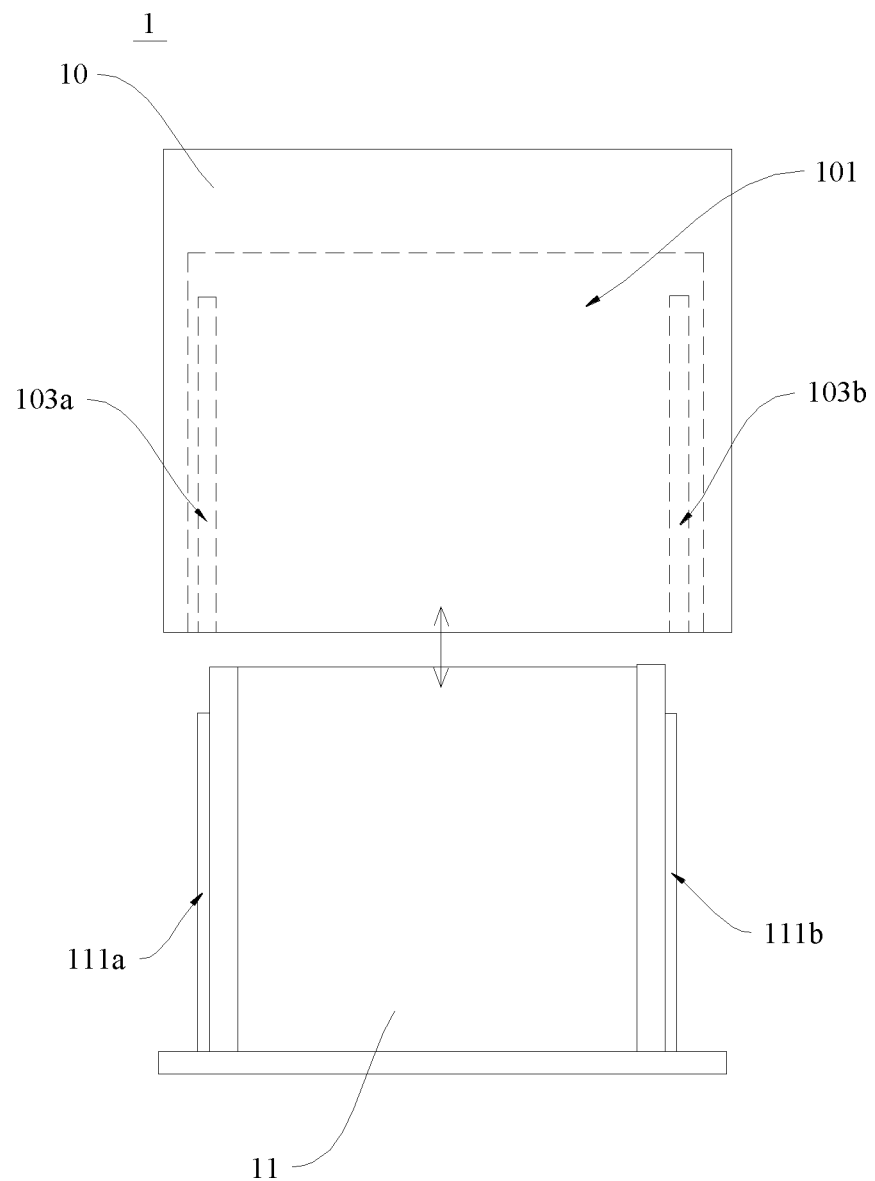
FIG. 4 is a schematic structural diagram of another fastening bracket and first bracket body according to an embodiment of this application.
Figure 5:
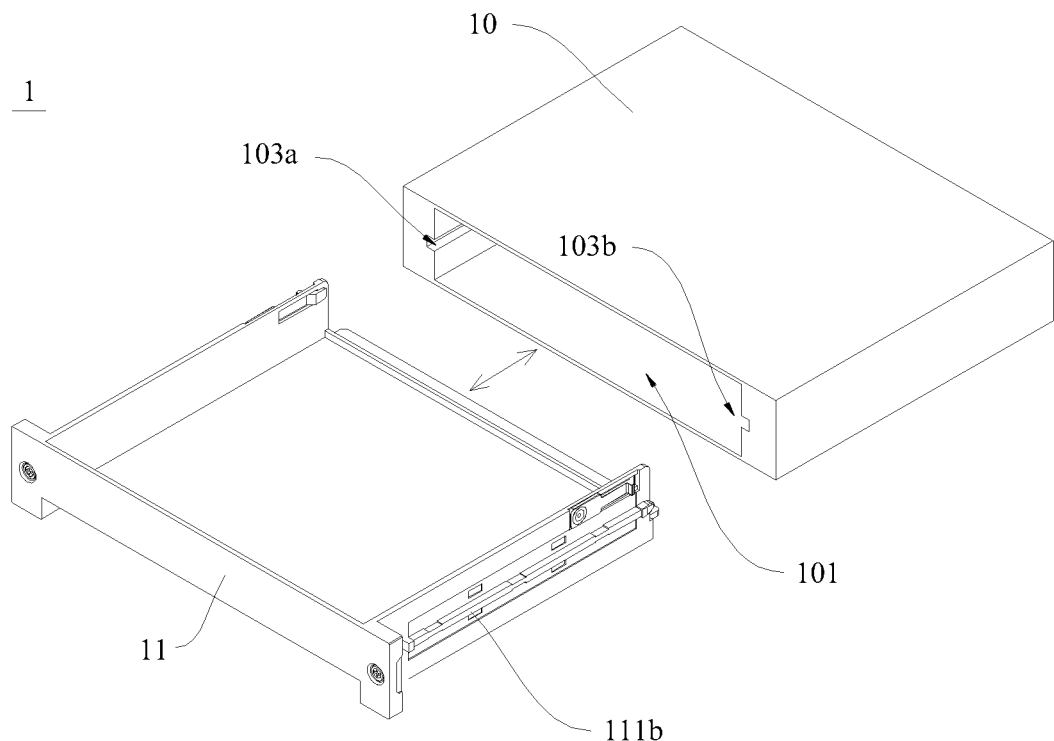
FIG. 5 is a schematic three-dimensional structural diagram of another fastening bracket and first bracket body according to an embodiment of this application.

As shown in FIG. 4 and FIG. 5, in an embodiment provided in this application, the accommodation cavity of the fastening bracket 10 has a guiding groove 103*a* and a guiding groove 103*b*, and the first bracket body 11 has a guiding rail 111*a* and a guiding rail 111*b* that slidably fit with the guiding groove 103*a* and the guiding groove 103*b*. When the first bracket body 11 and the fastening bracket 10 are assembled, the guiding groove 103*a* may be slidably fitted with the guiding rail 111*a* and the guiding groove 103*b* may be slidably fitted with the guiding rail 111*b*, and then the first bracket body 11 is pushed into the accommodation cavity 101, to complete the assembly between the first bracket body 11 and the fastening bracket 10 (it may be understood that an assembly manner between the first bracket body 11 and the fastening bracket 10 is similar to a drawer-type structure). To improve connection stability between the fastening bracket 10 and the first bracket body 11, in an embodiment provided in this application, the guiding groove 103*a* and the guiding groove 103*b* are oppositely disposed in the accommodation cavity 101, and correspondingly, the guiding rail 111*a* and the guiding rail 111*b* are respectively disposed on opposite left and right side surfaces of the first bracket body 11. Certainly, in another implementation, a guiding groove structure may be disposed on the first bracket body 11, or a guiding rail structure may be disposed on the fastening bracket 10. In addition, there may also be various quantities and structural forms of guiding rails and guiding grooves.

Figure 6:
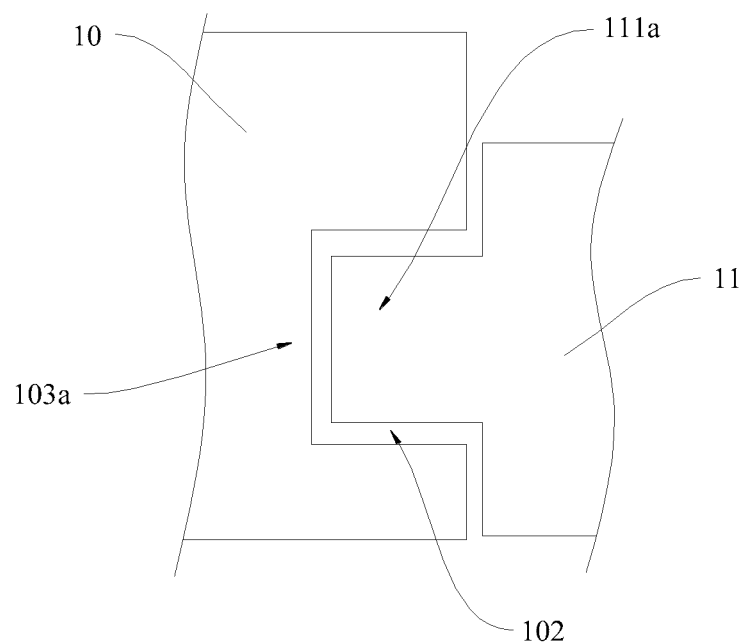
FIG. 6 is a schematic partial structural diagram of fitting between another fastening bracket and first bracket body according to an embodiment of this application.
Figure 7:
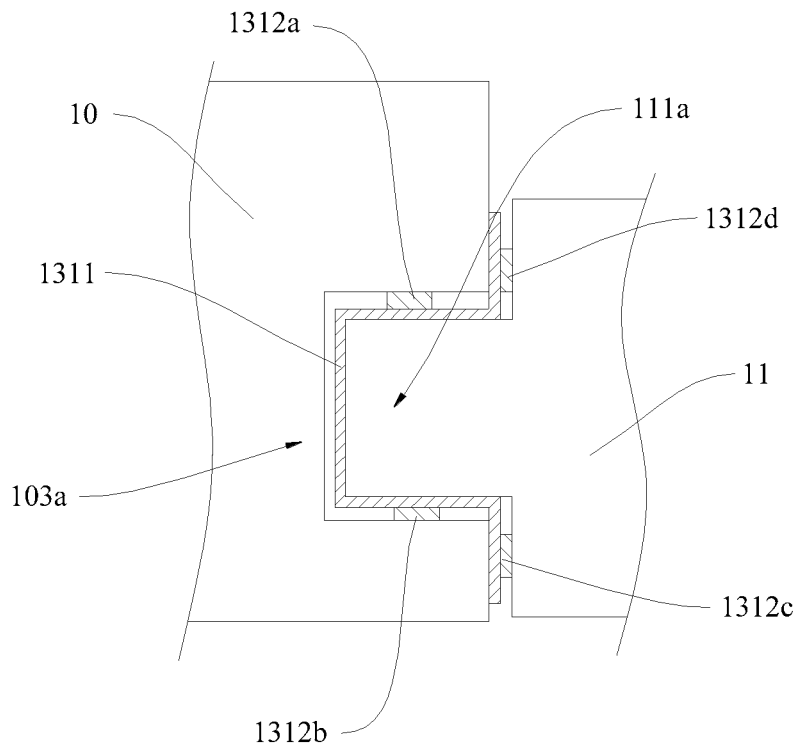
FIG. 7 is a schematic partial structural diagram of fitting between still another fastening bracket and first bracket body according to an embodiment of this application.

To damp vibration transmission between the fastening bracket 10 and the first bracket body 11, as shown in FIG. 6, the guiding rail 111*a* and the guiding groove 103*a* are used as an example. In an embodiment provided in this application, there is the sliding gap 102 between the guiding rail 111*a* and the guiding groove 103*a*. Referring to FIG. 7, the first vibration stopping part 131 may specifically include a spring plate 1311, and the spring plate 1311 has spring arms 1312*a*, 1312*b*, 1312*c*, and 1312*d*. The spring plate 1311 is disposed in the sliding gap 102 between the guiding groove 103*a* and the guiding rail 111*a*, to implement the elastic connection between the first bracket body 11 and the fastening bracket 10. When displacement (vibration) perpendicular to the sliding direction exists between the first bracket body 11 and the fastening bracket 10, the spring arms 1312*a*, 1312*b*, 1312*c*, and 1312*d* can well absorb the vibration (or reduce a displacement amount) through elastic deformation of the spring arms 1312*a*, 1312*b*, 1312*c*, and 1312*d*, to achieve a vibration damping effect.

During specific implementation, the spring plate 1311 may be fastened to the guiding rail 111*a*, and the spring arm 1312*a* and the spring arm 1312*b* may elastically abut against an inner wall of the guiding groove 103*a*. Certainly, alternatively, the spring plate 1311 may be fastened into the guiding groove 103*a*, and the spring arms may elastically abut against the guiding rail 111*a*, to implement the elastic connection between the fastening bracket 10 and the first bracket body 11.

In actual application, the spring plate 1311 may have various structural types, and the structural type may be adaptively adjusted based on specific structures of the guiding rail 111*a* and the guiding groove 103*a*.

Figure 8:
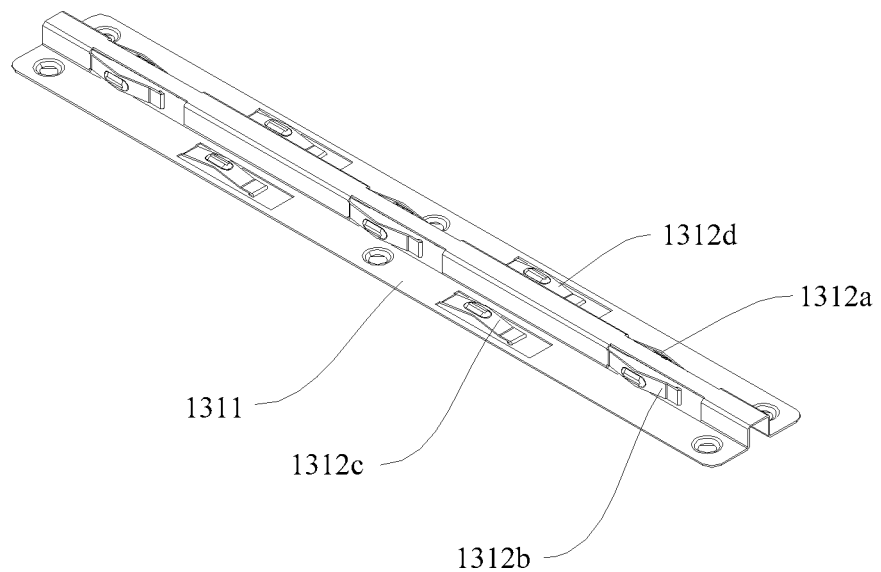
FIG. 8 is a schematic structural diagram of a first vibration stopping part according to an embodiment of this application.

In an embodiment provided in this application, the guiding groove 103*a* is structured as an elongated groove structure with a rectangular cross section, and the guiding rail 111*a* is structured as an elongated structure with a rectangular cross section. To implement the elastic connection between the fastening bracket 10 and the first bracket body 11, as shown in FIG. 8, in an embodiment provided in this application, the spring plate 1311 is structured as an elongated sheet-like structure with a roughly Ω-shaped cross section, that is, a shape profile of the spring plate 1311 is approximately the same as a profile of the gap 102 between the guiding groove 103a and the guiding rail 111a, so that a space occupation amount of the spring plate 1311 can be effectively reduced. Referring to FIG. 7, the spring plate 1311 is fastened to the first bracket body 11 and buckled on the periphery of the guiding rail 111a, and the spring plate 1311 has the upward bulged spring arm 1312a perpendicular to an upper surface of the guiding rail 111a and the downward bulged spring arm 1312b perpendicular to a lower surface of the guiding rail 111a. After the fastening bracket 10 is slidably fitted with the first bracket body 11 (the guiding rail 111a is inserted into the guiding groove 103a), the spring plate 1311 can elastically abut against the inner wall of the guiding groove 103a, so that vibration in a vertical direction can be absorbed. In addition, to enable the spring plate 1311 to absorb vibration in a horizontal direction, as shown in FIG. 7 and FIG. 8, the spring plate 1311 further has the outward bulged spring arms 1312c and 1312d perpendicular to a side surface of the first bracket body 11. After the fastening bracket 10 is slidably fitted with the first bracket body 11 (the guiding rail 111a is inserted into the guiding groove 103a), the spring plate 1311 can elastically abut against a side wall close to the guiding groove 103a in the fastening bracket 10, to absorb the vibration in the horizontal direction.

Figure 9:
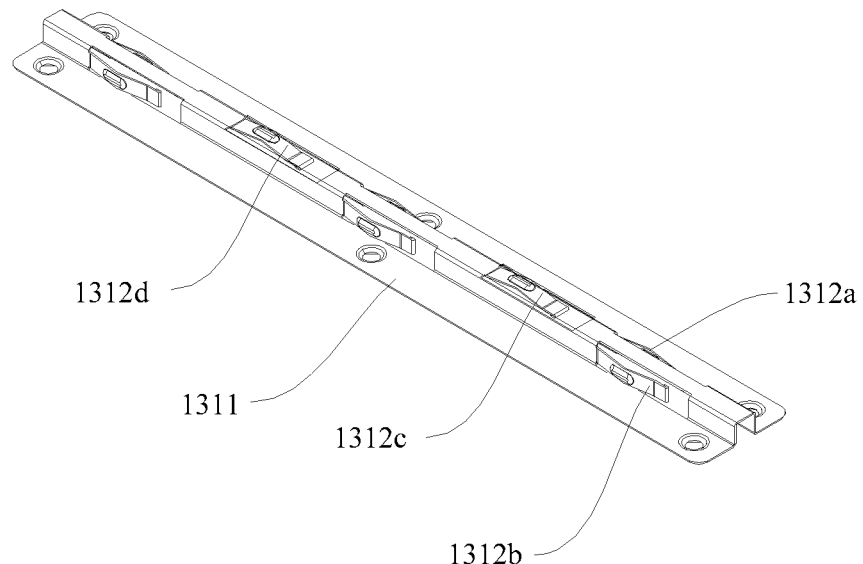
FIG. 9 is a schematic structural diagram of another first vibration stopping part according to an embodiment of this application.
Figure 10:
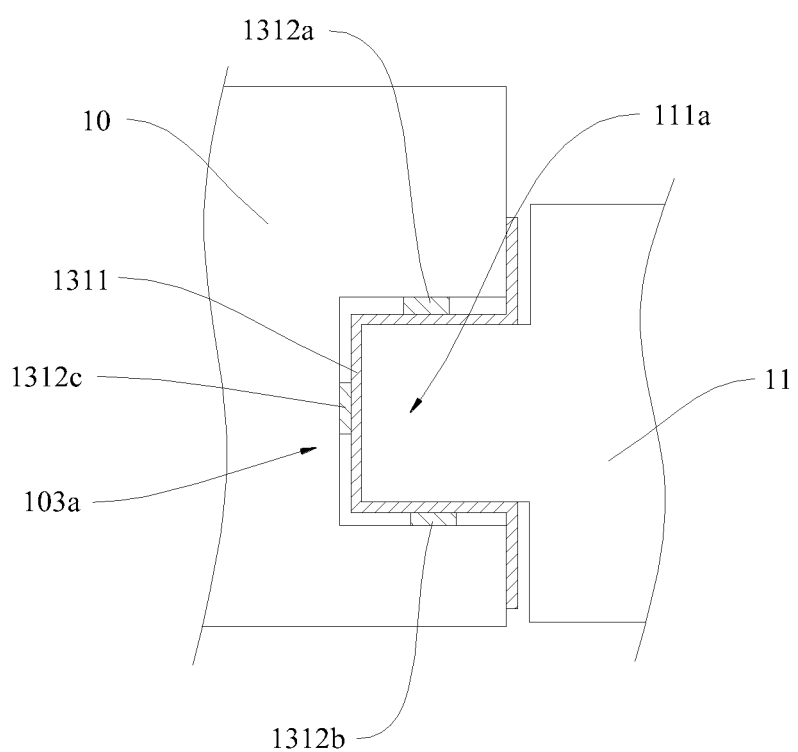
FIG. 10 is a schematic partial structural diagram of fitting between another fastening bracket and first bracket body according to an embodiment of this application.

Certainly, in some implementations, as shown in FIG. 9, the spring arm 1312c and the spring arm 1312d each may be disposed on a surface between the spring arm 1312a and the spring arm 1312b of the spring plate 1311. As shown in FIG. 10, after the fastening bracket 10 is slidably fitted with the first bracket body 11 (the guiding rail 111a is inserted into the guiding groove 103a), the spring arm 1312c (and the spring arm 1312d) can elastically abut against a bottom wall of the guiding groove 103a, to absorb the vibration in the horizontal direction.

When making the spring plate 1311, a flat metal sheet may be used as an embryonic material, and then processes such as stamping and cutting are used to mold the spring plate 1311. Certainly, in another implementation, the spring plate 1311 may be made by using a process such as injection molding. Details are not described in this application.

Figure 11:
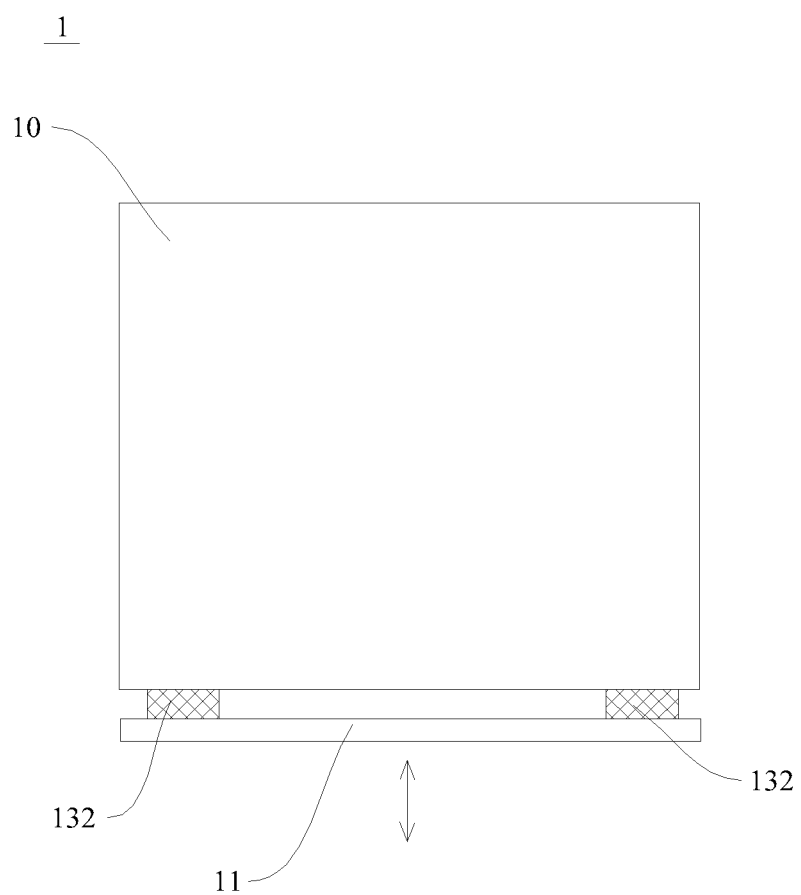
FIG. 11 is a schematic structural diagram of fitting between a fastening bracket and a first bracket body according to an embodiment of this application.

In addition, because the fastening bracket 10 and the first bracket body 11 are assembled in a slidable assembly manner, to prevent the first bracket body 11 from being detached from the fastening bracket 10 (the guiding rail from sliding out of the guiding groove), as shown in FIG. 11, in an embodiment provided in this application, the first vibration damping component 13 further includes a limiting component 132. The limiting component 132 is connected to the fastening bracket 10 and the first bracket body 11 to limit a maximum sliding distance between the fastening bracket 10 and the first bracket body 11. That is, after the first bracket body 11 and the fastening bracket 10 are slidably assembled (the guiding rail is inserted into the guiding groove), to prevent the first bracket body 11 from being detached from the fastening bracket 10 (the guiding rail from sliding out of the guiding groove), the fastening bracket 10 may be connected to the first bracket body 11 by using the limiting component 132. In addition, sliding with a relatively small displacement can be allowed between the first bracket body 11 and the fastening bracket 10.

Certainly, to prevent the fastening bracket 10 from rigidly colliding with the first bracket body 11 in the sliding direction, in an embodiment provided in this application, the first vibration damping component 13 further includes a second vibration stopping part 133, to absorb vibration between the first bracket body 11 and the fastening bracket 10 in the sliding direction.

Figure 12:
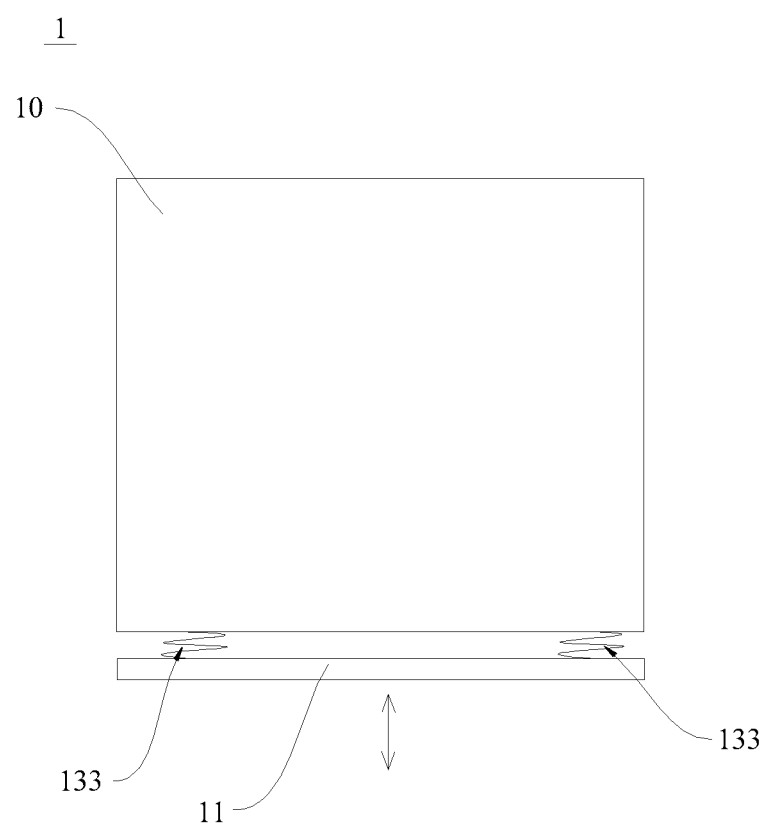
FIG. 12 is a schematic structural diagram of fitting between another fastening bracket and first bracket body according to an embodiment of this application.

As shown in FIG. 12, in an embodiment provided in this application, the second vibration stopping part 133 is specifically a spring, one end of the second vibration stopping part 133 is fixedly connected to the first bracket body 11, and the other end of the second vibration stopping part 133 is fixedly connected to the fastening bracket 10 (the second vibration stopping part 133 may serve as the limiting component 132). Under action of the second vibration stopping part 133, the maximum sliding distance between the fastening bracket 10 and the first bracket body 11 can be limited, to prevent the fastening bracket 10 from being detached from the first bracket body 11. In addition, when there is vibration between the fastening bracket 10 and the first bracket body 11 in the sliding direction, the second vibration stopping part 133 can further absorb the vibration through elastic deformation of the second vibration stopping part 133, to damp vibration transmission between the fastening bracket 10 and the first bracket body 11.

Certainly, in a specific implementation, the second vibration stopping part 133 may be a mechanical part such as a zigzag spring plate or a coil spring, and is not specifically limited in this application.

Figure 13:
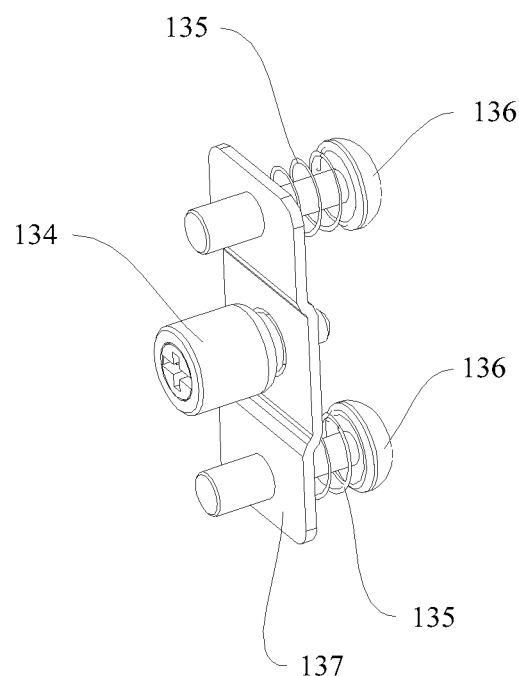
FIG. 13 is a schematic structural diagram of some components of a vibration damping bracket according to an embodiment of this application.
Figure 14:
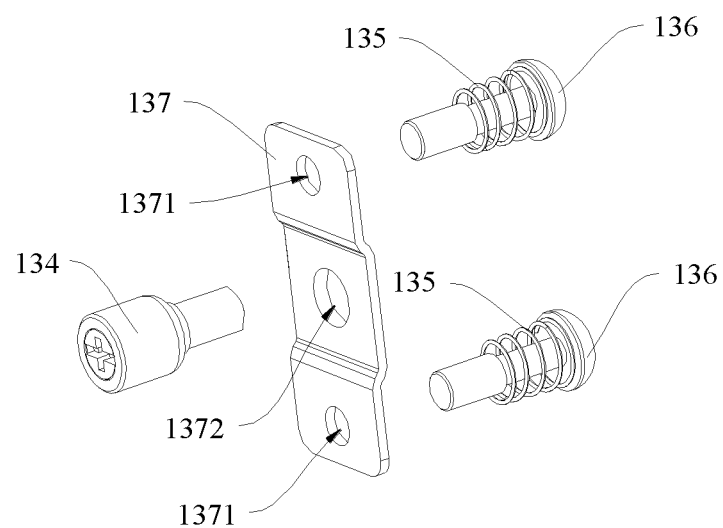
FIG. 14 is an exploded diagram of some components of a vibration damping bracket according to an embodiment of this application.
Figure 15:
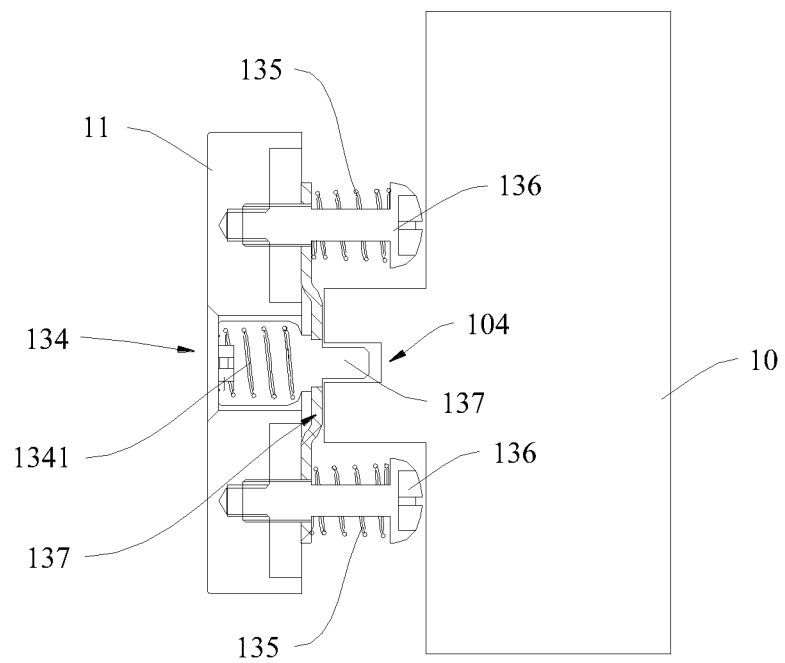
FIG. 15 is a schematic partial cross-sectional structural diagram of a vibration damping bracket according to an embodiment of this application.

For example, as shown in FIG. 13, in another embodiment provided in this application, a captive screw 134, a coil spring 135, a screw 136, and an auxiliary part 137 are combined to implement the elastic connection between the first bracket body 11 and the fastening bracket 10 in the sliding direction. Specifically, with reference to FIG. 14 and FIG. 15, a sliding hole 1371 is disposed in the auxiliary part 137, one end (a left end in FIG. 15) of the screw 136 is fixedly connected to the first bracket body 11 after being penetrated through the sliding hole 1371 in the auxiliary part 137, and the other end (a right end in FIG. 15) of the screw 136 abuts against the fastening bracket 10. When the first bracket body 11 and the fastening bracket 10 are made close to each other (vibrate), the coil spring 135 deforms due to compression, to absorb the vibration. The auxiliary part 137 has a through hole 1372, and the first bracket body 11 has a through hole (not shown in the figure) coaxially disposed with the through hole 1372. The captive screw 134 is screwed to a threaded hole 104 in the fastening bracket 10 after being penetrated through the through hole in the first bracket body 11 and the through hole 1372 in the auxiliary part. When the first bracket body 11 and the fastening bracket 10 are made far away from each other (vibrate), a coil spring 1341 in the captive screw 134 deforms due to compression, to absorb the vibration. Therefore, the elastic connection between the fastening bracket 10 and the first bracket body 11 is implemented.

Certainly, in another implementation, the position limiting and elastic connection between the first bracket body 11 and the fastening bracket 10 may be implemented in other structural forms. Details are not described in this application.

Figure 16:
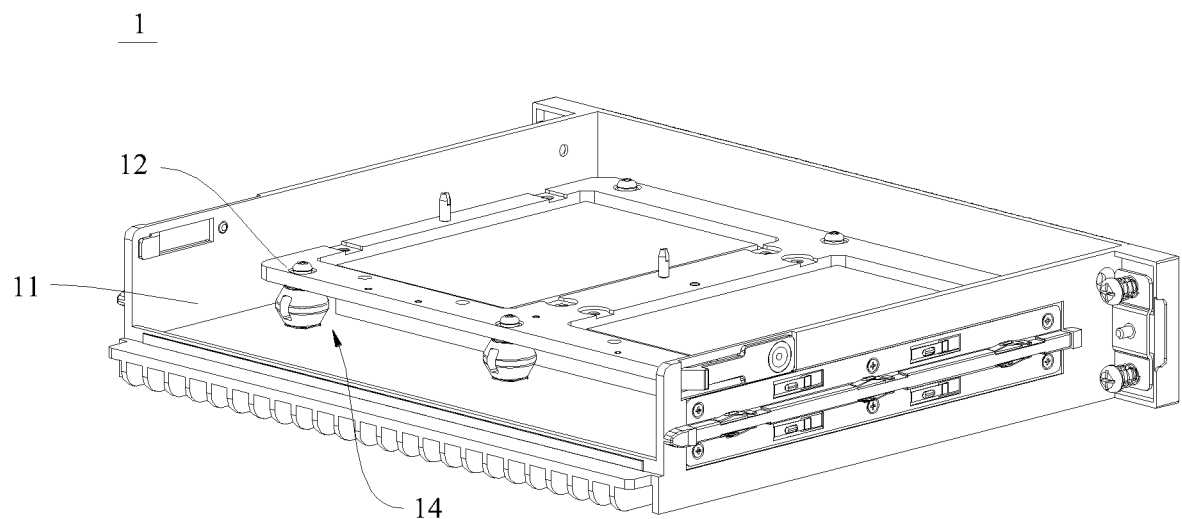
FIG. 16 is a schematic structural diagram of a vibration damping bracket according to an embodiment of this application.

To improve vibration damping performance of the vibration damping bracket 1, as shown in FIG. 16, in an embodiment provided in this application, the vibration damping bracket 1 further includes the second bracket body 12, and the first bracket body 11 is elastically connected to the second bracket body 12 by using the second vibration damping component 14.

Figure 17:
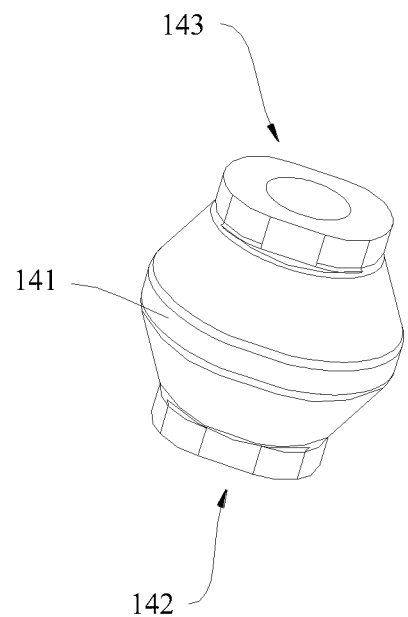
FIG. 17 is a schematic structural diagram of a second vibration damping component according to an embodiment of this application.
Figure 18:
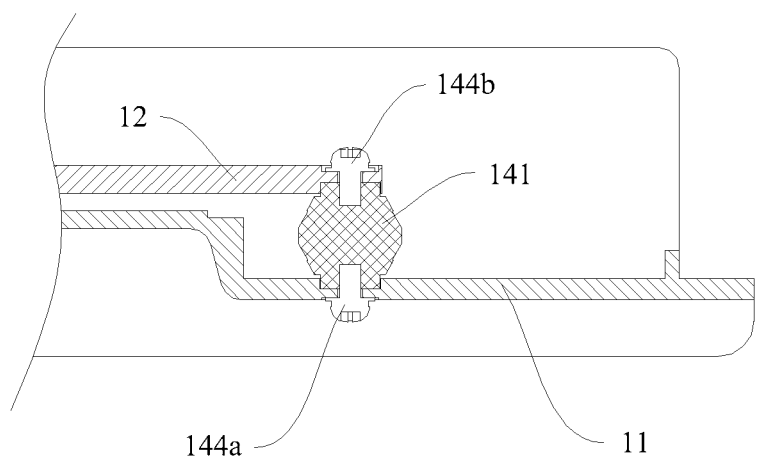
FIG. 18 is a schematic partial cross-sectional structural diagram of a vibration damping bracket according to an embodiment of this application.

Specifically, as shown in FIG. 17 and FIG. 18, the second vibration damping component 14 includes a first rubber body 141, the first rubber body is disposed between the first bracket body 11 and the second bracket body 12, and the first rubber body 141 is fixedly connected to the first bracket body 11 by using a first connecting portion 142 and is fixedly connected to the second bracket body 12 by using a second connecting portion 143. When vibration in the first bracket body 11 is transmitted to the second bracket body 12, the vibration can be well absorbed under action of the first rubber body 141, to damp the vibration transmitted to the second bracket body 12.

During specific implementation, the first rubber body 141 may be connected to the first bracket body 11 in a plurality of manners, and correspondingly, the first rubber body 141 may also be connected to the second bracket body 12 in a plurality of manners.

For example, in an embodiment provided in this application, the first rubber body 141 is connected to the first bracket body 11 by using a bolt 144a. Specifically, the first connecting portion 142 is structured as a threaded hole, the first bracket body 11 has a through hole (not shown in the figure), and the bolt 144a is screwed to the first connecting portion 142 in the first rubber body 141 after being penetrated through the through hole in the first bracket body 11, to implement the fastened connection between the first rubber body 141 and the first bracket body 11. The second connecting portion 143 is structured as a threaded hole, the second bracket body 12 has a through hole, and a bolt 144b is screwed to the second connecting portion 143 in the first rubber body 141 after being penetrated through the through hole in the second bracket body 12, to implement the fastened connection between the first rubber body 141 and the second bracket body 12.

When the first rubber body 141 is made, the first rubber body 141 may be molded by using a process such as injection molding, and the first connecting portion 142 and the second connecting portion 143 may also be integrally molded to form a threaded structure.

In some specific implementations, the first connecting portion 142 and the second connecting portion 143 may be independent mechanical parts.

Figure 19:
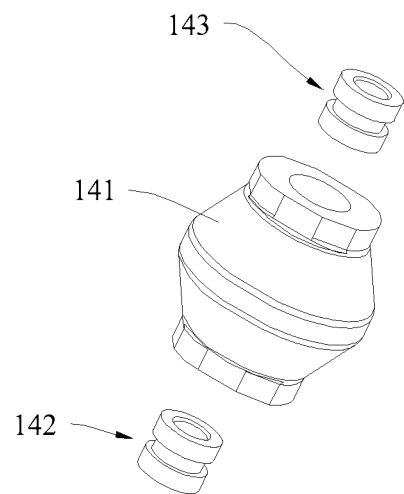
FIG. 19 is a schematic exploded structural diagram of another second vibration damping component according to an embodiment of this application.

As shown in FIG. 19, in an embodiment provided in this application, the first connecting portion 142 is a columnar structure with internal threads, and is embedded in the first rubber body 141. During specific implementation, the first connecting portion 142 may be made of a metal material (such as stainless steel), so that the first connecting portion 142 has relatively strong structural strength, to improve connection strength between the first connecting portion 142 and the bolt 144a. Correspondingly, the second connecting portion 143 may also be a columnar structure with internal threads, and is embedded in the first rubber body 141. During specific implementation, the second connecting portion 143 may also be made of a metal material (such as stainless steel), so that the second connecting portion 143 has relatively strong structural strength, to improve connection strength between the second connecting portion 143 and the bolt 144b. Therefore, connection strength between the first bracket body 11 and the second bracket body 12 is effectively improved.

Certainly, in another implementation, the first connecting portion 142 and the second connecting portion 143 may be structured as pin holes, the first rubber body 141 may be fixedly connected to the first bracket body 11 by using a pin, and the first rubber body 141 may be connected to the second bracket body 12 by using a pin. Certainly, in some specific implementations, the first rubber body 141 may be fixedly connected to the first bracket body 11 by using an adhesive such as glue, and correspondingly, the first rubber body 141 may also be fixedly connected to the second bracket body 12 by using an adhesive such as glue.

During specific implementation, the first rubber body 141 may be a solid structure, or may be a hollow structure.

Figure 20:
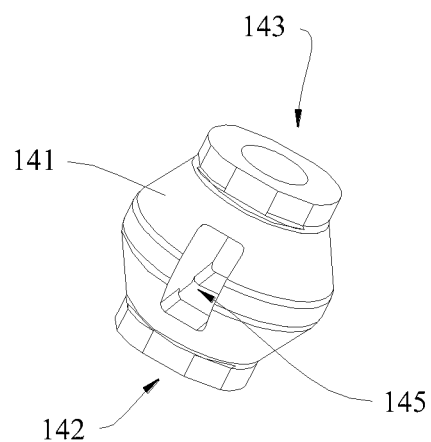
FIG. 20 is a schematic structural diagram of still another second vibration damping component according to an embodiment of this application.

As shown in FIG. 20, in an embodiment provided in this application, the first rubber body 141 is a centrally expanded columnar structure, the first connecting portion 142 is disposed on one end of the first rubber body 141, the second connecting portion 143 is disposed on the other end of the first rubber body 141, and a hollow portion 145 is disposed between the first connecting portion 142 and the second connecting portion 143. When there is vibration transmission between the first bracket body 11 and the second bracket body 12, a deformation amount of the first rubber body 141 may be improved due to disposition of the hollow portion 145. That is, under action of an external force (vibration), the first rubber body 141 is more prone to elastic deformation, thereby improving a vibration absorption effect.

During specific implementation, one or more hollow portions 145 may be disposed, and the hollow portion 145 may also have various shapes.

In some specific implementations, to improve vibration absorption performance of the vibration damping bracket 1, in addition to the fastening bracket 10, the first bracket body 11, the second bracket body 12, the first vibration damping component 13, and the second vibration damping component 14 in the foregoing embodiments, more bracket bodies and vibration damping components may be disposed in the vibration damping bracket 1.

Figure 21:
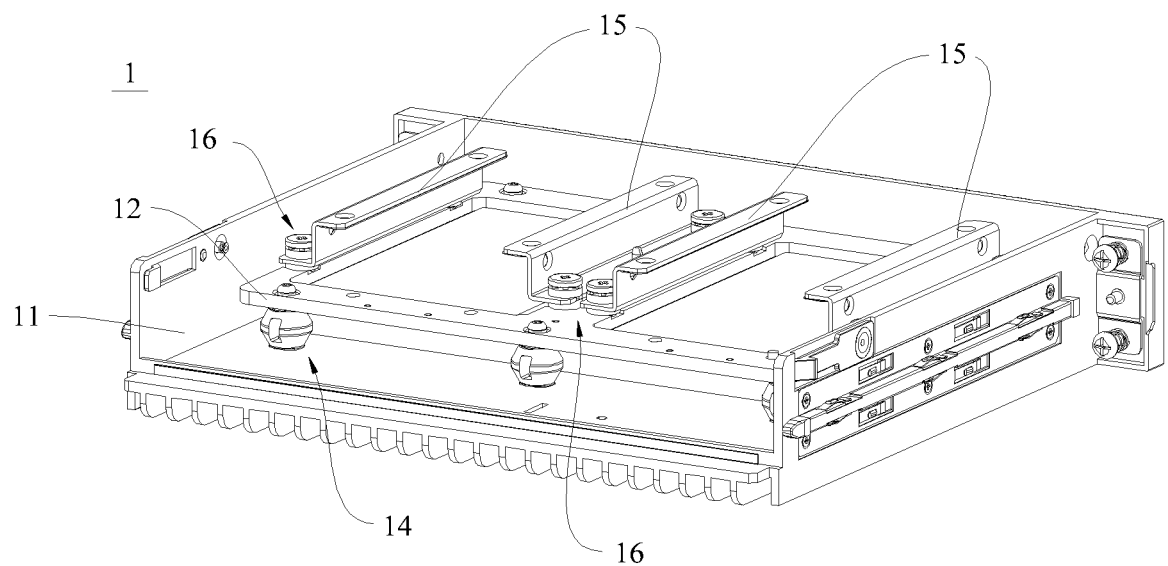
FIG. 21 is a schematic structural diagram of another vibration damping bracket according to an embodiment of this application.
Figure 22:
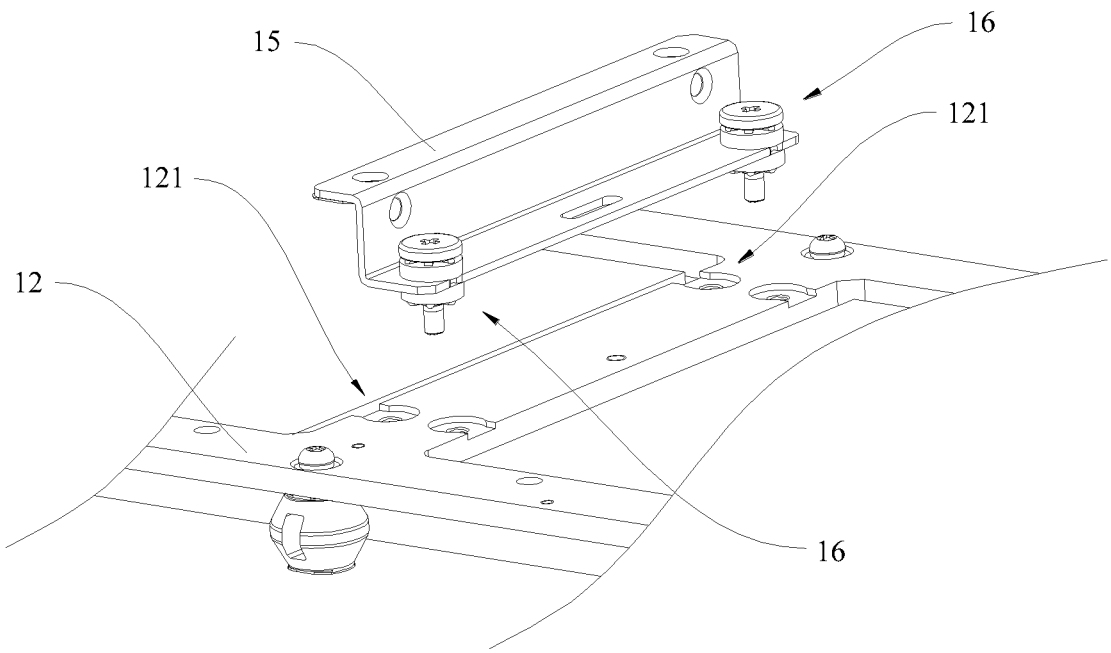
FIG. 22 is an exploded diagram of some components of a vibration damping bracket according to an embodiment of this application.
Figure 23:
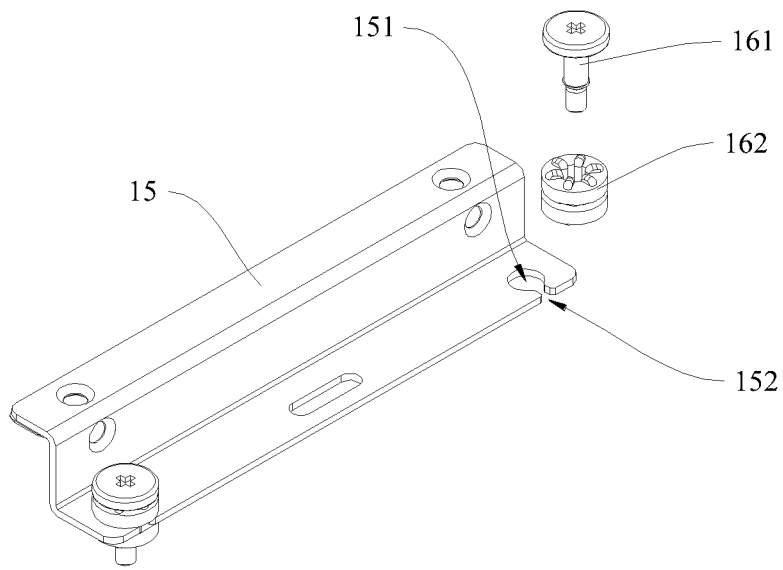
FIG. 23 is an exploded diagram of some other components of a vibration damping bracket according to an embodiment of this application.

Specifically, as shown in FIG. 21, in an embodiment provided in this application, the vibration damping bracket 1 further includes the third bracket body 15 and the third vibration damping component 16. The third bracket body 15 is elastically connected to the second bracket body 12 by using the third vibration damping component 16. During specific implementation, as shown in FIG. 22 and FIG. 23, the third vibration damping component 16 may include a connecting part 161 configured to connect the second bracket body 12 and the third bracket body 15. To damp vibration transmission between the second bracket body 12 and the third bracket body 15, the third vibration damping component 16 may further include a second rubber body 162. The second rubber body 162 may be located between the third bracket body 15 and the second bracket body 12 and between the third bracket body 15 and the connecting part 161, to effectively prevent the third bracket body 15 from being rigidly connected to the connecting part 161 and the second bracket body 12. When vibration is transmitted from the second bracket body 12 to the third bracket body 15, the vibration may be absorbed by using the second rubber body 162.

During specific implementation, the second rubber body 162 and the connecting part 161 may have various structures and fitting relationships.

Still referring to FIG. 22 and FIG. 23, in an embodiment provided in this application, the connecting part 161 may be specifically a bolt, a fastening hole 151 configured to fasten the second rubber body 162 may be disposed in the third bracket body 15, and a threaded hole 121 configured to be connected to the connecting part 161 may be disposed in the second bracket body 12. A through hole (not shown in the figure) through which the connecting part 161 is penetrated is disposed in the second rubber body 162, and the connecting part 161 may be screwed to the second bracket body 12 after being penetrated through the through hole in the second rubber body 162.

Figure 24:
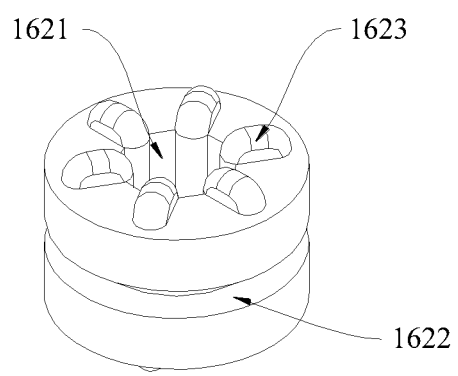
FIG. 24 is a schematic structural diagram of another second rubber body according to an embodiment of this application.

To implement fastening between the third bracket body 15 and the second rubber body 162, referring to FIG. 24, in an embodiment provided in this application, the second rubber body 161 is a columnar structure, a through hole 1621 through which the connecting part 161 is penetrated is disposed at an axis of the second rubber body 161, and an annular groove 1622 is disposed on the periphery of the second rubber body 161. The third bracket body 15 has an opening 152 connected to the fastening hole 151, and the second rubber body 161 may be inserted into the fastening hole 151 through the opening 150, so that the annular groove 1622 is tightly clamped to the fastening hole 151 in the third bracket body 15 through fitting. After the connecting part 161 is screwed to the threaded hole 121 in the second bracket body 12, one end (an upper end in FIG. 24) of the second rubber body 161 abuts against a screw cap of the connecting part 161, and the other end (a lower end in FIG. 24) of the second rubber body 161 abuts against the second bracket body 12, thereby preventing the third bracket body 15 from being in rigid contact with the second bracket body 12 and the connecting part 161.

In some specific implementations, to improve vibration absorption performance of the second rubber body 162, as shown in FIG. 24, convex structures 1623 may be disposed on both ends of the second rubber body 162 and in the through hole 1621. Specifically, an upper-end convex structure 1623 may abut against the screw cap of the connecting part 161, a lower-end convex structure 1623 may abut against the second bracket body 12, and a convex structure 1623 in the through hole 1621 may abut against a rod portion of the connecting part 161. When vibration to be transmitted to the third bracket body 15 exists on the second bracket body 12, the convex structures 1623 are more prone to elastic deformation, to efficiently absorb (relatively slight) vibration, thereby improving the shock absorption performance of the second rubber body 162.

It may be understood that the first bracket body 11 may be alternatively elastically connected to the second bracket body 12 by using the foregoing third vibration damping component 16, and correspondingly, the second bracket body 12 may be alternatively elastically connected to the third bracket body 15 by using the foregoing second vibration damping component 14. In addition, in some specific implementations, the vibration damping bracket 1 may further include more levels of bracket bodies and vibration damping components. For example, the vibration damping bracket 1 may further include a fourth bracket body similar to the third bracket body 15 and a fourth vibration damping component similar to the third vibration damping component 16. The fourth bracket body may be elastically connected to the third bracket body 15 by using the fourth vibration damping component, and the fourth vibration damping component may be a structure similar to the foregoing first vibration damping component 13 or second vibration damping component 14, or may be a different structure. In addition, a plurality of second bracket bodies 12 may be fastened to the first bracket body 11, and each second bracket body 12 may be fastened to the first bracket body 11 by using a plurality of second vibration damping components 14. A plurality of third bracket bodies 15 may also be fastened to the second bracket body 12, and each third bracket body 15 may be fastened to the second bracket body 12 by using a plurality of third vibration damping components 16.

During actual application, the vibration damping bracket 1 provided in the embodiments of this application may be widely applied to any environment in which vibration needs to be damped.

Figure 25:
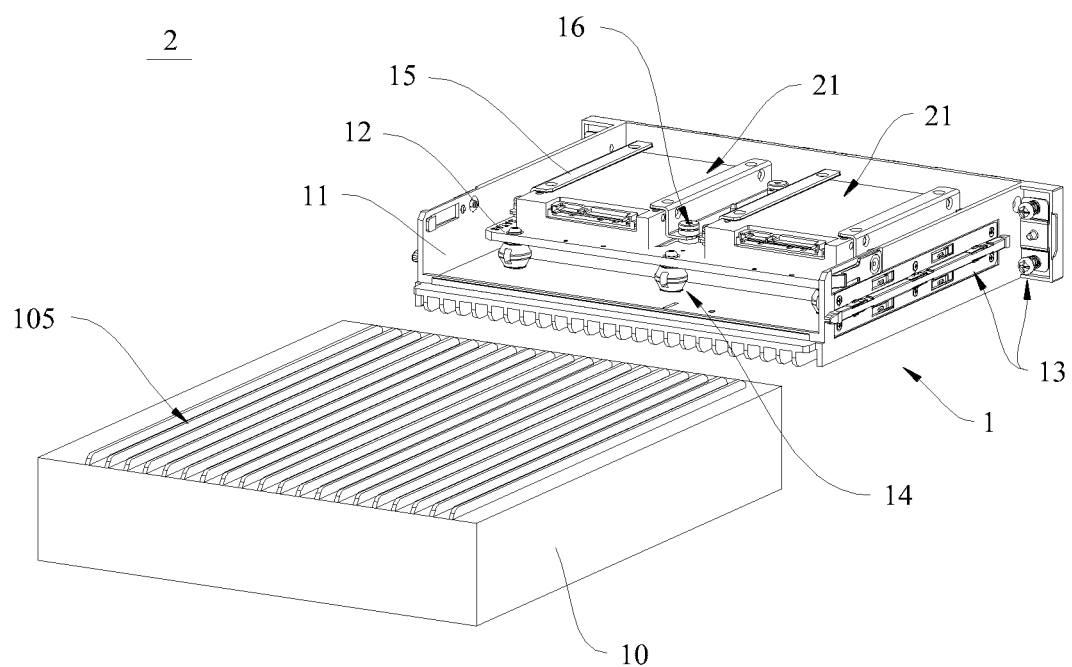
FIG. 25 is a schematic exploded structural diagram of an electronic device according to an embodiment of this application.

For example, as shown in FIG. 25, an embodiment of this application further provides an electronic device 2, including an electrical component 21 and the vibration damping bracket 1 in any one of the foregoing embodiments.

For example, the vibration damping bracket 1 includes a fastening bracket 10, a first bracket body 11, a second bracket body 12, a third bracket body 15, a first vibration damping component 13, a second vibration damping component 14, and a third vibration damping component 16. The electrical component 21 may be fixedly mounted on the third bracket body 15, and the fastening bracket 10 may be used as a housing of the electronic device 2 or as a mechanical part having another function.

During actual application, there may be various specific types and quantities of electrical components 21. For example, the electrical component 21 may be a processor, a removable hard disk, a circuit board, or the like. In addition, the electrical component 21 may also be fastened to various positions on the vibration damping bracket 1. For example, in an embodiment provided in this application, two electrical components 21 are included, and each electrical component 21 is fastened by using two third bracket bodies 15.

In some implementations, some electrical components 21 may be fastened to the first bracket body 11, and some electrical components 21 relatively sensitive to vibration may be fastened to the third bracket body 15, so that positions of electrical components 21 may be properly adjusted based on different requirements.

In addition, in an embodiment provided in this application, the fastening bracket 10 may further serve as a heat sink to accelerate dissipation of heat in the electrical component 21. Specifically, a component such as a heat sink fin 105 or a fan may be disposed on the fastening bracket 10, to improve heat dissipation performance of the fastening bracket 10, thereby ensuring normal working of the electrical component 21. Certainly, in some implementations, a structure similar to the heat sink fin 105 may also be disposed on the first bracket body 11, the second bracket body 12, or the third bracket body 15 to improve heat dissipation performance.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A vibration damping bracket, comprising a fastening bracket, a first bracket body, a second bracket body, a first vibration damping component, and a second vibration damping component, wherein:
   the first bracket body is elastically connected to the fastening bracket by using the first vibration damping component;
   the second bracket body is elastically connected to the first bracket body by using the second vibration damping component; and the first vibration damping component comprises a metal elastic part configured to absorb vibration, and the second vibration damping component comprises a rubber elastic part configured to absorb vibration, wherein the metal elastic part comprises a first vibration stopping part disposed in a sliding gap between the first bracket body and the fastening bracket.

2. The vibration damping bracket according to claim 1, wherein the first bracket body is slidably mounted on the fastening bracket.

3. The vibration damping bracket according to claim 2, wherein:
the first vibration stopping part is configured to absorb vibration perpendicular to a sliding direction.

4. The vibration damping bracket according to claim 3, wherein:
the fastening bracket comprises a guiding groove, and the first bracket body comprises a guiding rail that slidably fits with the guiding groove; and
the first vibration stopping part comprises a spring plate, and the spring plate comprises at least one spring arm.

5. The vibration damping bracket according to claim 4, wherein the first vibration stopping part is fixedly connected to the guiding rail, and the spring arm elastically abuts against at least a part of an inner wall of the guiding groove.

6. The vibration damping bracket according to claim 4, wherein the first vibration stopping part is fixedly connected to the guiding groove, and the spring arm elastically abuts against at least a part of a surface of the guiding rail.

7. The vibration damping bracket according to claim 2, wherein:
the first vibration damping component further comprises a limiting component; and
the limiting component is connected to the fastening bracket and the first bracket body, the limiting component is configured to limit a maximum sliding distance between the fastening bracket and the first bracket body.

8. The vibration damping bracket according to claim 2, wherein:
the metal elastic part further comprises a second vibration stopping part; and
the second vibration stopping part is disposed between the fastening bracket and the first bracket body, the second vibration stopping part is configured to absorb vibration in a sliding direction.

9. The vibration damping bracket according to claim 1, wherein:
the rubber elastic part comprises a first rubber body; and
the first rubber body is disposed between the first bracket body and the second bracket body, and the first bracket body is elastically connected to the second bracket body by using the first rubber body.

10. The vibration damping bracket according to claim 9, wherein a first connecting portion is configured to be fixedly connected to the first bracket body, a second connecting portion is configured to be fixedly connected to the second bracket body, and the first connecting portion and the second connecting portion are disposed on the first rubber body.

11. The vibration damping bracket according to claim 10, wherein a hollow portion is disposed between the first connecting portion and the second connecting portion.

12. The vibration damping bracket according to claim 1, wherein:
the second vibration damping component further comprises a connecting part, and the rubber elastic part comprises a second rubber body;
the first bracket body is connected to the second bracket body by using the connecting part; and
the second rubber body is located between the second bracket body and the first bracket body and between the second bracket body and the connecting part.

13. The vibration damping bracket according to claim 1, wherein:
the vibration damping bracket further comprises a third bracket body and a third vibration damping component; and
the third bracket body is elastically connected to the second bracket body by using the third vibration damping component.

14. The vibration damping bracket according to claim 1, wherein the fastening bracket comprises a guiding groove, and the first bracket body comprises a guiding rail that slidably fits with the guiding groove.

15. An electronic device, comprising an electrical component and a vibration damping bracket, wherein the vibration damping bracket comprises a fastening bracket, a first bracket body, a second bracket body, a first vibration damping component, and a second vibration damping component, and wherein:
the first bracket body is elastically connected to the fastening bracket by using the first vibration damping component;
the second bracket body is elastically connected to the first bracket body by using the second vibration damping component; and
the first vibration damping component comprises a metal elastic part configured to absorb vibration, and the second vibration damping component comprises a rubber elastic part configured to absorb vibration, wherein the metal elastic part comprises a first vibration stopping part, and the first vibration stopping part is disposed in a sliding gap between the first bracket body and the fastening bracket.

16. The electronic device according to claim 15, wherein the first vibration stopping part is configured to absorb vibration perpendicular to a sliding direction.

17. The electronic device according to claim 15, wherein:
the first vibration damping component further comprises a limiting component; and
the limiting component is connected to the fastening bracket and the first bracket body, the limiting component is configured to limit a maximum sliding distance between the fastening bracket and the first bracket body.

18. The electronic device according to claim 15, wherein:
the metal elastic part further comprises a second vibration stopping part; and
the second vibration stopping part is disposed between the fastening bracket and the first bracket body, the second vibration stopping part is configured to absorb vibration in a sliding direction.

19. The electronic device according to claim 15, wherein:
the rubber elastic part comprises a first rubber body; and
the first rubber body is disposed between the first bracket body and the second bracket body, and the first bracket body is elastically connected to the second bracket body by using the first rubber body.

20. The electronic device according to claim 15, wherein:
the second vibration damping component further comprises a connecting part, and the rubber elastic part comprises a second rubber body;
the first bracket body is connected to the second bracket body by using the connecting part; and the second rubber body is located between the second bracket body and the first bracket body and between the second bracket body and the connecting part.

* * * * *